(12) United States Patent
Cohen et al.

(10) Patent No.: US 6,230,220 B1
(45) Date of Patent: *May 8, 2001

(54) METHOD FOR ALLOCATING EITHER PRIVATE OR SHARED BUFFER MEMORY FOR STORING DATA FROM SORT OPERATIONS IN ACCORDANCE WITH AN ASSIGNED VALUE OR THRESHOLD VALUE

(75) Inventors: Jeffrey I. Cohen, Mountain View; William H. Waddington, Foster City, both of CA (US)

(73) Assignee: Oracle Corporation, Redwood Shores, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/127,438

(22) Filed: Jul. 31, 1998

Related U.S. Application Data

(63) Continuation of application No. 08/634,694, filed on Apr. 18, 1996, now Pat. No. 5,799,210.

(51) Int. Cl.$^7$ ................................ G06F 3/00; G06F 12/00
(52) U.S. Cl. ...................... 710/52; 711/118; 711/121; 711/130
(58) Field of Search ................. 710/56, 52; 711/117, 711/118, 121, 130; 707/7

(56) References Cited

U.S. PATENT DOCUMENTS

| | | | |
|---|---|---|---|
| 4,967,341 | 10/1990 | Yamamoto et al. | 395/602 |
| 5,089,985 | 2/1992 | Chang et al. | 395/602 |
| 5,179,662 | 1/1993 | Corrigan et al. | 395/402 |
| 5,210,870 | 5/1993 | Baum et al. | 395/607 |
| 5,237,661 * | 8/1993 | Kawamura et al. | 710/52 |
| 5,491,810 * | 2/1996 | Allen | 711/117 |
| 5,535,384 * | 7/1996 | Kashara | 707/7 |
| 5,581,736 | 12/1996 | Smith | 395/497.01 |
| 5,640,561 | 6/1997 | Satoh et al. | 395/618 |
| 5,799,210 * | 8/1998 | Cohen et al. | 710/56 |

* cited by examiner

*Primary Examiner*—Le Hien Luu
(74) *Attorney, Agent, or Firm*—Hickman Palermo Truong & Becker; Carl L. Brandt; Brian D. Hickman

(57) ABSTRACT

A method and apparatus are provided for allocating buffer memory for database sort operations. A database parameter is set to determine whether and how direct write buffers are to be allocated for sort operations. If the parameter is set to a first value, then direct write buffers will be used to perform writes to disk. The size and number of direct write buffers to be used will be determined by the values set in other database parameters. If the parameter is set to a second value, then no direct write buffers will be used, and sort operations will write to disk through a buffer cache. If the parameter is set to a third value, direct write buffers will be allocated a portion of the memory available to perform the sort operation. The size and number of direct write buffers will be determined in accordance with database formulae that are designed to optimize sort and data write performance.

17 Claims, 4 Drawing Sheets

METHOD FOR ALLOCATING EITHER PRIVATE OR SHARED BUFFER MEMORY FOR STORING DATA FROM SORT OPERATIONS IN ACCORDANCE WITH AN ASSIGNED VALUE OR THRESHOLD VALUE

This application is a continuation of patent application Ser. No. 08/634,694, filed by Jeffrey I. Cohen and William H. Waddington, on Apr. 18, 1996, entitled "Method for Allocating Either Private or Shared Buffer Memory for Storing Data from Sort Operations in Accordance with an Assigned Value or Threshold Value (As Amended)" and issued as U.S. Pat. No. 5,799,210 on Aug. 25, 1998, the contents of which are incorporated herein by reference in their entirety.

FIELD OF THE INVENTION

The present invention relates to buffer memory allocation, and more specifically, to a method and apparatus for allocating direct write buffers for computer processes that perform sort operations.

BACKGROUND OF THE INVENTION

In typical database systems, users store, update and retrieve information by submitting commands to a database application. To be correctly processed, the commands must comply with the database language that is supported by the database application. One popular database language is known as Structured Query Language (SQL).

A logical unit of work that is comprised of one or more database language statements is referred to as a transaction. When multiple users share a database system, it is impractical to allow only one transaction to execute at a time. However, when many transactions are allowed to execute at the same time, it is possible for the transactions to interact in undesirable ways.

Some database systems provide a buffer cache that is shared among the processes that are executing transactions in a database. The buffer cache is a pool of dynamic memory that is used for temporarily storing blocks of data. All processes are allowed to read and store data to the buffer cache. However, to prevent undesirable interaction between processes, only one process or special group of processes, referred to herein as the "writer process", writes updated data from the buffer cache to the database.

Some transactions require sort operations to be performed on data from the database. Space in dynamic memory is required to perform such sort operations. The portion of memory allocated to a transaction to perform a sort operation is referred to as a sort area.

After a process performs a sort operation, the sorted data may have to be written to the database. Typically, the database is updated by writing the sorted data to the buffer cache, and allowing the writer process to store the sorted data from the buffer cache to the database. However, a single process for writing data to a disk represents a potential bottleneck for data throughput, especially where multiple, concurrent users of the database are performing operations that require data to be written to the database.

Consequently, some database systems allow transactions to write sorted data directly to a disk. During direct write sorts, sorted data is written to a set of write buffers that are not shared with other processes. The sorted data is written asynchronously from the write buffers directly to disk, thereby bypassing the buffer cache.

Database systems that allow processes to write sorted data directly to disk often allow a user to specify the number and size of the write buffers. The database system may provide program parameters which the user could set to specify the characteristics of the write buffers. For example, one parameter could be used to set the number of write buffers, and a second parameter could be used to set the size of each write buffer.

Under operating conditions where available memory space is abundant on the system, the direct write sort method is a quick and efficient way to perform database sort operations. Under these conditions, the buffer size and number parameters could be set to values which exceed the expected memory requirements for possible sort operations. However, under operating conditions where memory resources are limited and memory space is not readily available, allocating memory for large write buffers during sorts could result in a reduction of the overall performance of the database.

Based on the foregoing, it is clearly desirable to provide a database system that provides for automatic tuning so that the number and size of write buffers is allocated in accordance with the amount of memory available for sort operations and without the need for user programming of fixed tuning parameters.

SUMMARY OF THE INVENTION

A method and apparatus for allocating buffer memory for database sort operations is provided. According to one aspect of the invention, a programmable database parameter is provided to specify the manner in which buffer memory is allocated for the sort operation.

If the parameter is set to a first value, the process performing the sort operation will write the data to the storage medium through direct write buffers, thus bypassing the buffer cache. The size and number of buffers to be used are specified by additional database parameters.

If the parameter is set to a second value, the sort operation will not allocate any memory for direct buffering, and will instead write data to a buffer cache shared with other transactions.

If the parameter is set to a third value, the sort operation will utilize direct write buffers if the amount of memory allocated to the sort operation exceeds a predetermined minimum threshold. If the sort area does exceed this minimum threshold, direct write buffers will be allocated as a fraction of the amount of memory allocated for the sort operation up to a predetermined maximum threshold. If the sort area does not exceed the minimum threshold, the sorted data will be written to a buffer cache shared with other processes.

BRIEF DESCRIPTION OF THE DRAWINGS

The present invention is illustrated by way of example, and not by way of limitation, in the figures of the accompanying drawings and in which like reference numerals refer to similar elements and in which.

DETAILED DESCRIPTION OF THE PREFERRED EMBODIMENT

A method and apparatus for allocating buffer memory for sort operations is described. In the following description, for the purposes of explanation, numerous specific details are set forth in order to provide a thorough understanding of the present invention. It will be apparent, however, to one skilled in the art that the present invention may be practiced without these specific details. In other instances, well-known structures and devices are shown in block diagram form in order to avoid unnecessarily obscuring the present invention.

HARDWARE OVERVIEW

Figure 1:
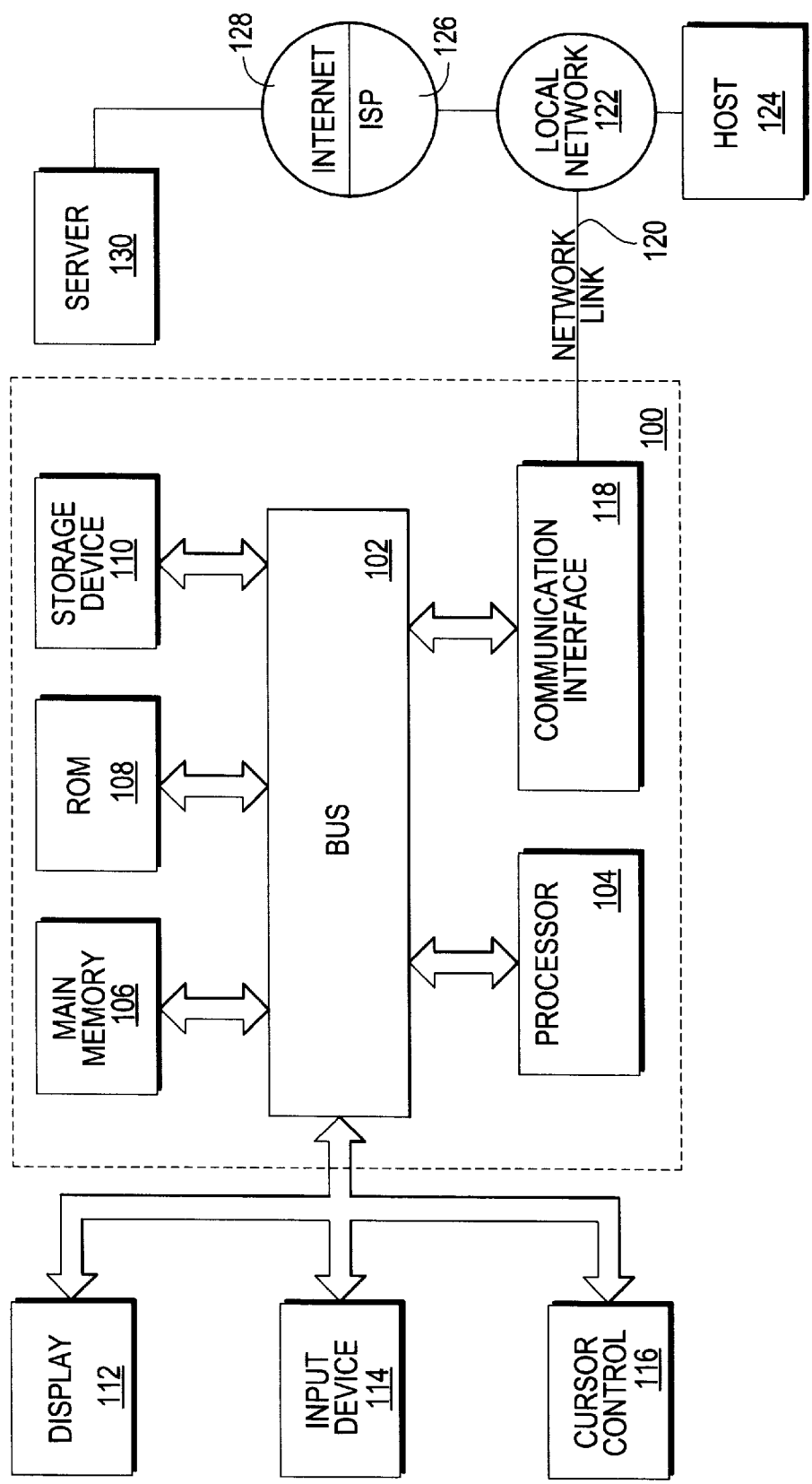
FIG. 1 is a block diagram illustrating a computer system that may be used to implement the present invention.

FIG. 1 is a block diagram that illustrates a computer system 100 upon which an embodiment of the invention may be implemented. Computer system 100 includes a bus 102 or other communication mechanism for communicating information, and a processor 104 coupled with bus 102 for processing information. Computer system 100 also includes a main memory 106, such as a random access memory (RAM) or other dynamic storage device, coupled to bus 102 for storing information and instructions to be executed by processor 104. Main memory 106 also may be used for storing temporary variables or other intermediate information during execution of instructions to be executed by processor 104. Computer system 100 further includes a read only memory (ROM) 108 or other static storage device coupled to bus 102 for storing static information and instructions for processor 104. A storage device 110, such as a magnetic disk or optical disk, is provided and coupled to bus 102 for storing information and instructions.

Computer system 100 may be coupled via bus 102 to a display 112, such as a cathode ray tube (CRT), for displaying information to a computer user. An input device 114, including alphanumeric and other keys, is coupled to bus 102 for communicating information and command selections to processor 104. Another type of user input device is cursor control 116, such as a mouse, a trackball, or cursor direction keys for communicating direction information and command selections to processor 104 and for controlling cursor movement on display 112. This input device typically has two degrees of freedom in two axes, a first axis (e.g., x) and a second axis (e.g., y), that allows the device to specify positions in a plane.

The invention is related to the use of computer system 100 for allocating buffer memory for sort operations. According to one embodiment of the invention, allocation of buffer memory is provided by computer system 100 in response to processor 104 executing one or more sequences of one or more instructions contained in main memory 106. Such instructions may be read into main memory 106 from another computer-readable medium, such as storage device 110. Execution of the sequences of instructions contained in main memory 106 causes processor 104 to perform the process steps described herein. In alternative embodiments, hard-wired circuitry may be used in place of or in combination with software instructions to implement the invention. Thus, embodiments of the invention are not limited to any specific combination of hardware circuitry and software.

The term "computer-readable medium" as used herein refers to any medium that participates in providing instructions to processor 104 for execution. Such a medium may take many forms, including but not limited to, non-volatile media, volatile media, and transmission media. Non-volatile media includes, for example, optical or magnetic disks, such as storage device 110. Volatile media includes dynamic memory, such as main memory 106. Transmission media includes coaxial cables, copper wire and fiber optics, including the wires that comprise bus 102. Transmission media can also take the form of acoustic or light waves, such as those generated during radio-wave and infra-red data communications.

Common forms of computer-readable media include, for example, a floppy disk, a flexible disk, hard disk, magnetic tape, or any other magnetic medium, a CD-ROM, any other optical medium, punchcards, papertape, any other physical medium with patterns of holes, a RAM, a PROM, and EPROM, a FLASH-EPROM, any other memory chip or cartridge, a carrier wave as described hereinafter, or any other medium from which a computer can read.

Various forms of computer readable media may be involved in carrying one or more sequences of one or more instructions to processor 104 for execution. For example, the instructions may initially be carried on a magnetic disk of a remote computer. The remote computer can load the instructions into its dynamic memory and send the instructions over a telephone line using a modem. A modem local to computer system 100 can receive the data on the telephone line and use an infra-red transmitter to convert the data to an infra-red signal. An infra-red detector can receive the data carried in the infra-red signal and appropriate circuitry can place the data on bus 102. Bus 102 carries the data to main memory 106, from which processor 104 retrieves and executes the instructions. The instructions received by main memory 106 may optionally be stored on storage device 110 either before or after execution by processor 104.

Computer system 100 also includes a communication interface 118 coupled to bus 102. Communication interface 118 provides a two-way data communication coupling to a network link 120 that is connected to a local network 122. For example, communication interface 118 may be an integrated services digital network (ISDN) card or a modem to provide a data communication connection to a corresponding type of telephone line. As another example, communication interface 118 may be a local area network (LAN) card to provide a data communication connection to a compatible LAN. Wireless links may also be implemented. In any such implementation, communication interface 118 sends and receives electrical, electromagnetic or optical signals that carry digital data streams representing various types of information.

Network link 120 typically provides data communication through one or more networks to other data devices. For example, network link 120 may provide a connection through local network 122 to a host computer 124 or to data equipment operated by an Internet Service Provider (ISP) 126. ISP 126 in turn provides data communication services through the world wide packet data communication network now commonly referred to as the "Internet" 128. Local network 122 and Internet 128 both use electrical, electromagnetic or optical signals that carry digital data streams. The signals through the various networks and the signals on network link 120 and through communication interface 118, which carry the digital data to and from computer system 100, are exemplary forms of carrier waves transporting the information.

Computer system 100 can send messages and receive data, including program code, through the network(s), network link 120 and communication interface 118. In the Internet example, a server 130 might transmit a requested code for an application program through Internet 128, ISP 126, local network 122 and communication interface 118. In accordance with the invention, one such downloaded application provides for allocating buffer memory for sort operations as described herein.

The received code may be executed by processor 104 as it is received, and/or stored in storage device 110, or other non-volatile storage for later execution. In this manner, computer system 100 may obtain application code in the form of a carrier wave.

In one embodiment of the invention, computer system 100 is configured to execute a database application that performs sort operations on data that is to be written to the database. The memory utilized for the performance of the sort operation may be a portion of main memory 106. The amount of memory allocated to perform the sort operation is specified by a programmable database parameter. Such a parameter may be called SORT_AREA_SIZE, and take a value in Kbytes or Mbytes, depending on the availability of memory and the size of the sort operations to be performed.

According to one embodiment of the invention, a database having multiple buffering modes for sort operations is provided. According to one embodiment, the buffering mode used by the database is controlled by a parameter whose value may be set by a user. Such a parameter shall be referred to herein as SORT_DIRECT_WRITE. According to one embodiment, the parameter can assume three possible values: FALSE, TRUE, or AUTO.

When SORT_DIRECT_WRITE is set to FALSE, no direct write buffers are used and sort operations will write to disk through a buffer cache.

When SORT_DIRECT_WRITE is set to TRUE, write buffers are used to write data directly to disk. As shall be described hereafter, the number and size of these buffers may be determined by the values of the parameters SORT_WRITE_BUFFERS and SORT_WRITE_BUFFER_SIZE, respectively. Thus, when SORT_DIRECT_WRITE is set to TRUE, a user selectable tuning method is utilized.

When SORT_DIRECT_WRITE is set to AUTO, an automatic tuning method is utilized. In one embodiment, a set percentage of the sort area is allocated to buffer space as long as there is a minimum amount of sort area memory, and until a maximum amount of buffer memory is reached. Other embodiments of automatic tuning may not require a minimum amount of sort area memory from which to allocate buffer space, or a maximum threshold on the amount of buffer memory allocated.

In one embodiment, the SORT_DIRECT_WRITE parameter can be a database-wide parameter that is set to a particular default value when the database is started, or set by a database administrator. As a database-wide parameter, this parameter determines the method of database tuning for all users of the database at a particular time. Alternatively, the SORT_DIRECT_WRITE parameter can be a user specific parameter which can be set and reset by an individual user, or group of users, to determine the method of database tuning only as to those users. For example, the SORT_DIRECT_WRITE parameter might be passed as a switch in a database query operation.

BUFFER CACHE SORT

As mentioned above, sorted data is written to a database through a buffer cache when SORT_DIRECT_WRITE is set to FALSE. A buffer cache is a pool of buffers used to cache data that is provided by a database. The buffer cache is shared among processes that access data in the database. In some database systems, a process performing a sort operation on data from a database will use a buffer cache to store sorted data that is to be written to a storage medium, such as a disk. This buffer cache represents a process pipeline which temporarily stores data to be written, and queues write operations among multiple processes or users. In this way, a buffer cache operates as a concurrency monitor to ensure that only one process writes to disk at a time. A buffer cache can be embodied in a dedicated memory unit which is independent of any of the memory allocated for the sort operation. While this method reduces the amount of memory required to perform sort operations, it presents a single process bottleneck through which data is written to disk.

SORT DIRECT WRITES

As further mentioned above, when SORT_DIRECT_WRITE is set to either TRUE or AUTO, write buffers may be used to write data directly to disk. The Sort Direct Write method is asynchronous and direct since the database program does not have to wait for the write to complete before the function that writes the buffer returns, and the program queues its own writes and does not rely upon a server process. A sort operation will write an entire buffer for each input/output operation, and the database process performing the sort will write the sort data directly to the storage medium. The direct write buffer memory is released when the last row is fetched from the sort space.

Figure 2:
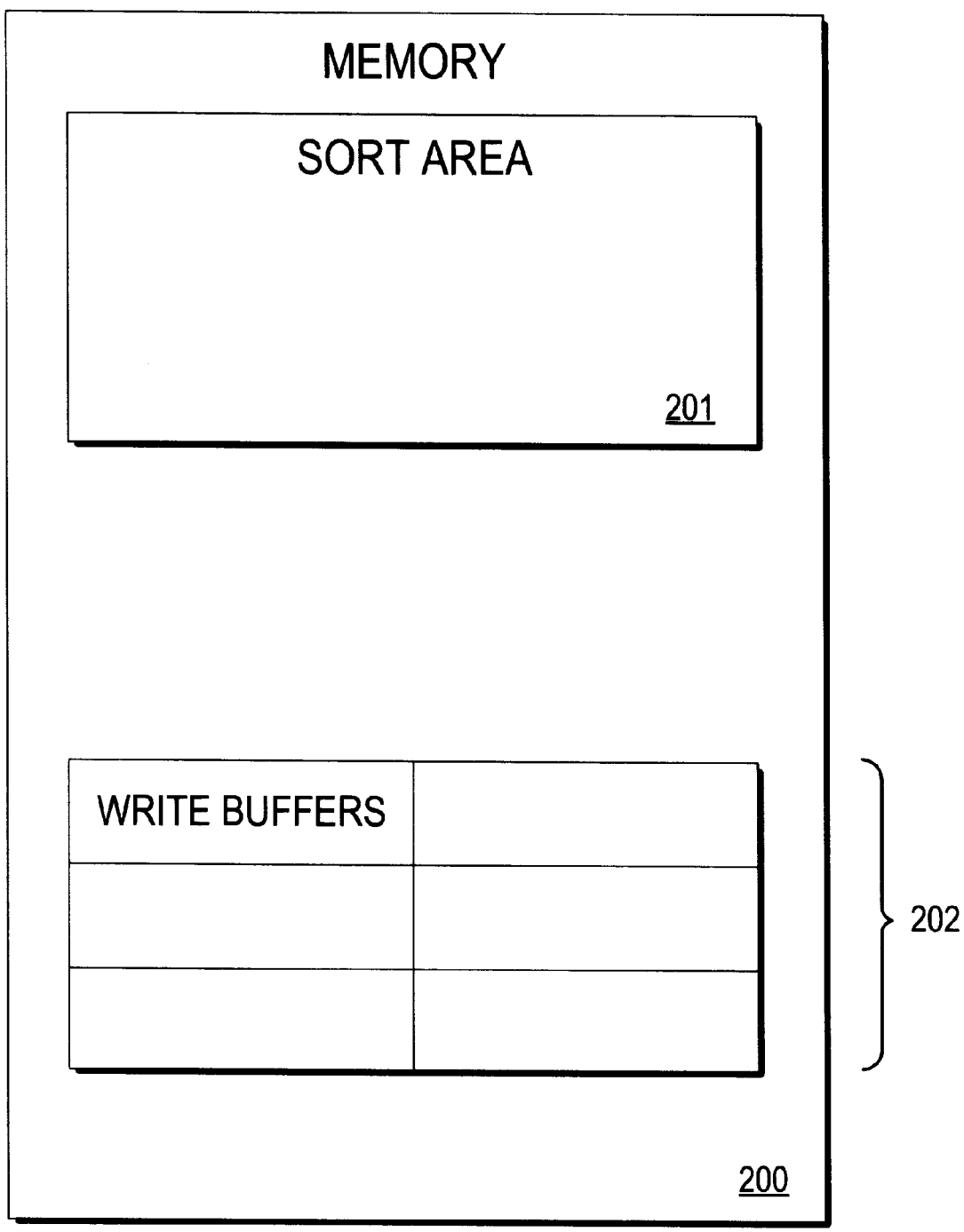
FIG. 2 illustrates a separate sort area and write buffer area within the memory of a computer system.

The memory space allocated to write buffers may be divided into multiple independent buffers, or may comprise one single autonomous buffer. FIG. 2 illustrates a set of write buffers 202 as a portion of memory 200. The number of buffers that the buffer space is divided into, and the size of each buffer, is dependent upon several factors including the amount of memory, the number of concurrent users, and the type of sort process being executed.

Figure 3:
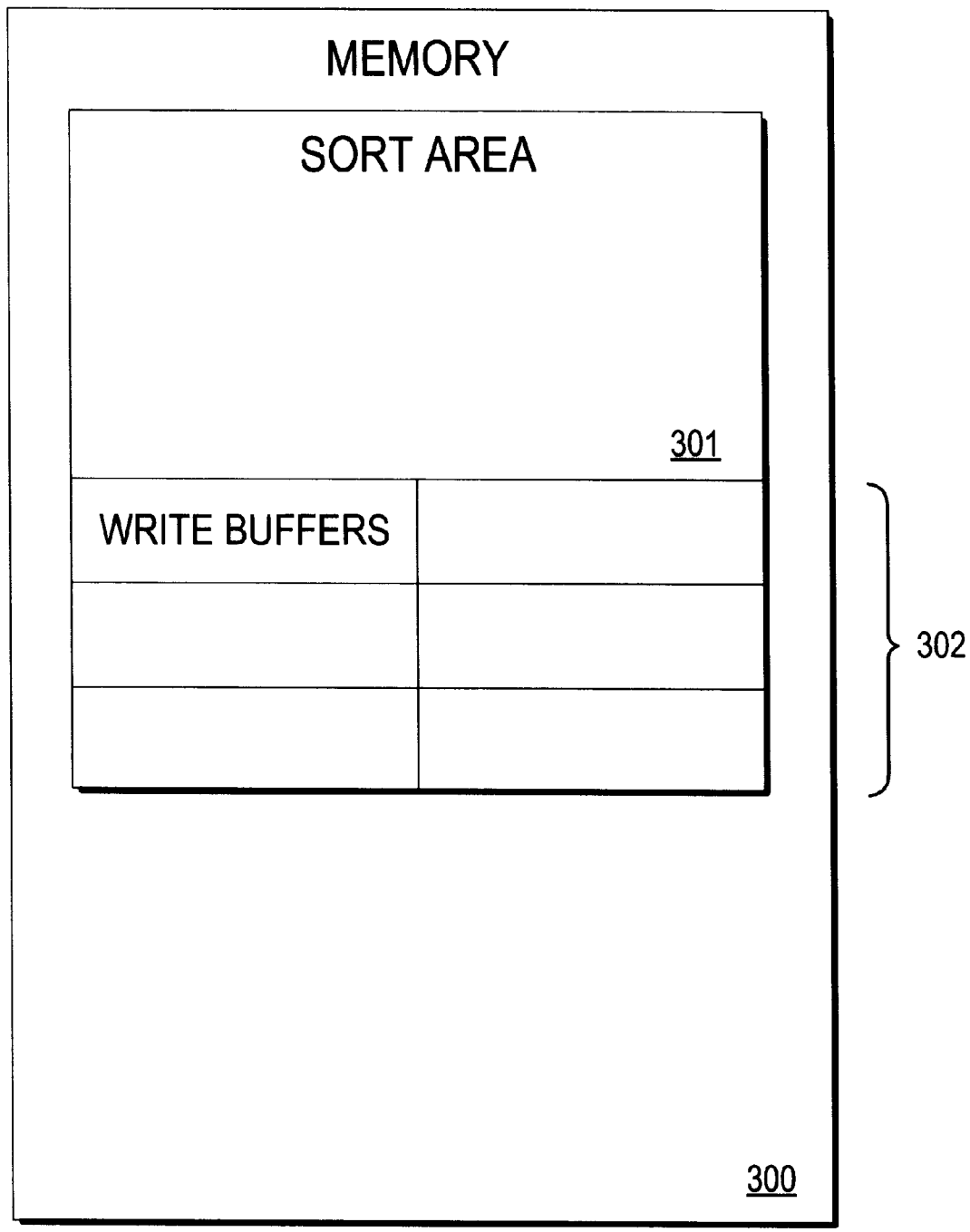
FIG. 3 illustrates the allocation of write buffer area as a portion of sort area when user selectable tuning is utilized.

The number and size of direct write buffers must be specified by the database. If there is sufficient memory in the computer system, then memory for write buffers can be allocated independently of memory allocated for the sort area. This configuration is illustrated in FIG. 2, where the Sort Area 201 is separate from the Write Buffer area 202. If the amount of memory is constrained however, then write buffers may need to occupy some portion of the memory allocated to the sort area. FIG. 3 illustrates the configuration where the Write Buffer area 302 is a subportion of Sort Area 301 within memory 300.

DATABASE TUNING

When write buffers are used to write sorted data directly to disk, it is often desirable to increase the amount of memory allocated to these buffers so that more data can be written to disk during each write operation. Thus, in general, as buffer memory is increased, data write performance is increased. However, if memory for the write buffers is allocated from portion of the sort area, then memory for the sort area decreases, as memory for the write buffers increases. As the size of the sort area is reduced, the performance of the sort operations may decrease since large sort operations will require increased sorts to disk if they cannot complete a sort within the allocated memory. Therefore, performance tradeoffs must be made between data writes and sort operations, as memory is allocated between write buffers and sort area.

Maintaining the optimum balance between the memory allocated to the write buffers and the sort area depends on several factors such as the amount of memory in the computer system, the number of database users, and the number and size of expected sort operations. The process of allocating memory for the direct write buffers from a portion of the sort area to maintain an optimum balance is one aspect of "tuning" the database.

USER SELECTABLE BUFFER MEMORY ALLOCATION

In one embodiment wherein the SORT_DIRECT_WRITE parameter is set to TRUE, memory for the sort area and direct write buffers is allocated by programming one or more additional database parameters.

In one such embodiment, two database parameters are provided to specify the size and number of write buffers to be used for Sort Direct Writes. A database parameter, SORT_WRITE_BUFFERS, takes an integer value and can be used to specify the number of write buffers. Likewise, a parameter, SORT_WRITE_BUFFER_SIZE, takes a byte value and can be used to specify the size of each direct write buffer.

The amount of write buffer memory available for each database process that performs sort operations will be determined by the formula:

$$SORT\_WRITE\_BUFFERS * SORT\_WRITE\_BUFFER\_SIZE$$

If memory is abundant, the direct write buffers can be allocated memory which is not a portion of the sort area. In this case, buffer memory will add to the memory specified by the parameter SORT_AREA_SIZE. The allocation of memory between sort area and write buffers, where write buffer memory is independent of the sort area is illustrated in FIG. 2.

Alternatively, if memory is constrained, the sort area can be decreased by the amount of memory allocated to the direct write buffers. In this case, the portion of the sort area memory allocated for direct write buffers should be determined using tuning techniques that provide the optimum compromise between sort operation performance and direct write performance. For many applications, the total memory allocated for write buffers should comprise less than ten percent of the memory allocated for the sort area. If the memory allocated to the write buffers is greater than ten percent of the sort area, then the number of sorts to disk will likely increase, and overall performance will correspondingly decrease. The allocation of memory between the sort area and write buffers, where write buffer memory is a portion of the sort area is illustrated in FIG. 3.

One example of a range of values for the write buffer parameters is as follows:

| | |
|---|---|
| SORT_WRITE_BUFFER_SIZE: | 32 Kbytes to 64 Kbytes. |
| SORT_WRITE_BUFFERS: | 2 to 8 |

These values provide for a minimum of 64 Kbytes, and a maximum of 512 Kbytes of write buffers. The size of the each write buffer should be calculated as a multiple of the database block size, rather than an arbitrary value.

The values given above for the two write buffer parameters are intended only to be examples of possible values for the user selectable mode of database tuning. Actual values will depend on a number of factors such as the type of sort algorithm used by the database program, the number of database users, and the amount of memory available in the computer system, among others.

In one embodiment, the parameters SORT_WRITE_BUFFER_SIZE and SORT_WRITE_BUFFERS may be set by the database administrator. In this case, the direct write buffer space is set at one time for all users of the database regardless of the number and size of their respective sort operations. This provides the advantage of central control over the memory resources of the computer system, and reduces the amount of programming and decision-making required by individual users.

In another embodiment, the parameters SORT_WRITE_BUFFER_SIZE and SORT_WRITE_BUFFERS may be set individually by each database user, or group of database users. This scheme provides the advantage of allowing users to tailor their memory requirements to fit their individual needs, and allows for a more efficient use of memory across the entire database.

In yet another embodiment, the parameters SORT_WRITE_BUFFER_SIZE and SORT_WRITE_BUFFERS may be passed as switches in database transactions that perform sort operations. This scheme allows the allocation of buffer memory on individual database operations independently of the users of the database who perform the sort operation.

AUTOMATIC BUFFER MEMORY ALLOCATION

In one embodiment wherein the SORT_DIRECT_WRITE parameter is set to AUTO, memory for the sort area and direct write buffers is automatically allocated by the database program to be a portion of the sort area. This auto tuning mechanism eliminates the need for the database administrator or individual users to manually set buffer size and number parameters such as the SORT_WRITE_BUFFERS and SORT_WRITE_BUFFER_SIZE parameters mentioned above.

Figure 4:
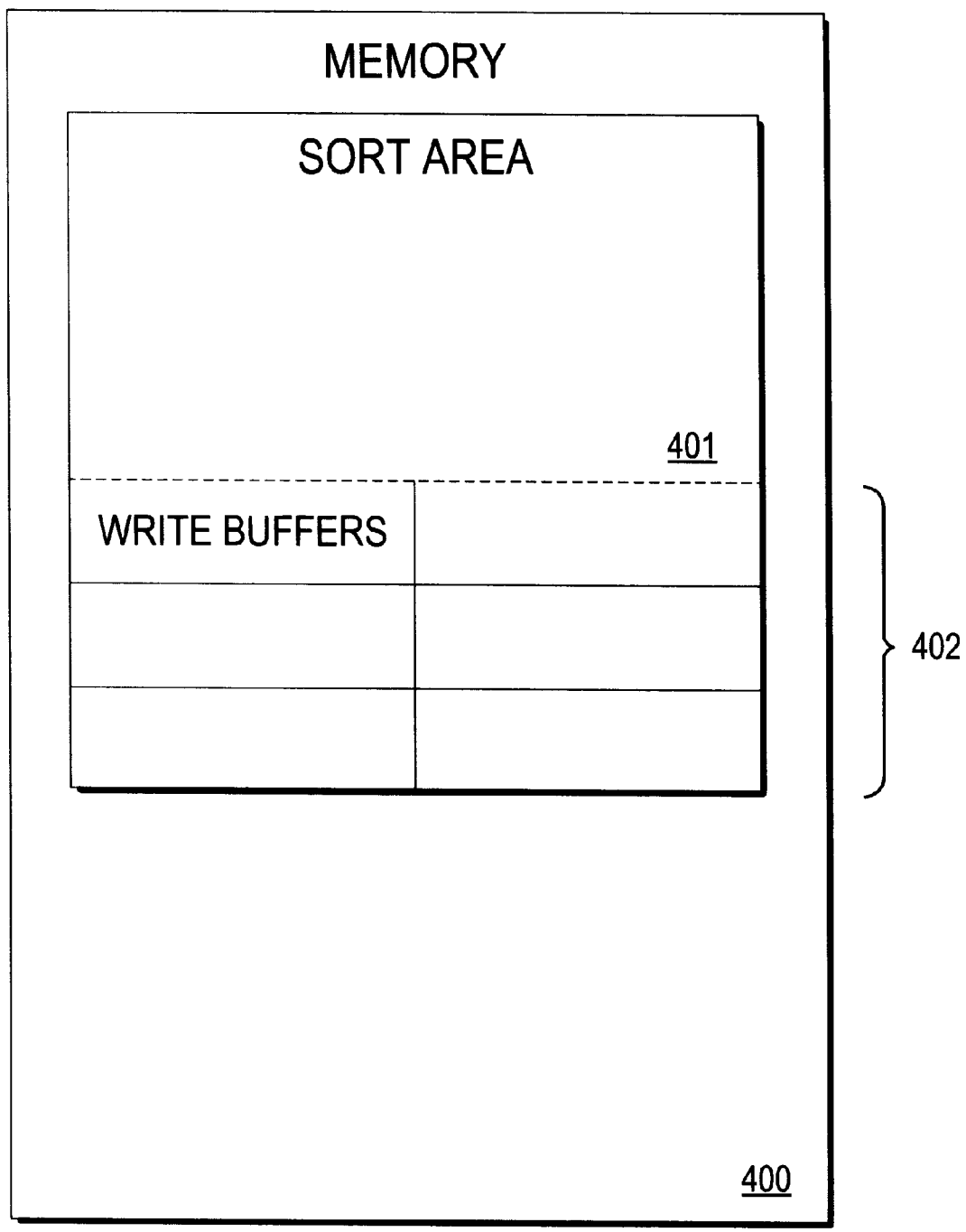
FIG. 4 illustrates the allocation of write buffer area as a portion of sort area when automatic tuning is utilized.

FIG. 4 illustrates the composition of memory 400 as allocated to Sort Area 401 and Write Buffers 402. The dashed line between the Sort Area and the Write Buffer space denotes that the database will automatically allocate memory to the write buffers as a portion of the sort area.

In one embodiment of automatic buffer memory allocation, an arithmetic formula may be provided in the database for use by database transactions which perform sort operations to determine how much sort area to allocate to write buffers. The factors to be included in the formula may include the percentage of the sort area to be allocated to write buffers, the minimum amount of sort area memory required for direct write buffers, the maximum amount of memory to be allocated to write buffers, and the number and size of the write buffers.

1. Percentage of Sort Area Allocated to Write Buffers

One variable related to automatic tuning is the percentage of the sort area that is allocated to write buffer space. Conceivably, anywhere between zero to one hundred percent of the sort area can be allocated to write buffer space. The optimum percentage of the sort area allocated to buffer space will depend upon several factors, such as the particular requirements of individual sort operations, the number of database users, and the availability of computer system resources.

In one embodiment, the percentage of sort area to be allocated to buffer memory may be expressed in a mathematical formula. For example, the sort area size could be multiplied by a fractional value to derive the buffer memory space.

For example, if optimum performance is achieved when ten percent of the sort area is allocated to write buffer space, then the formula to be provided in the database could be of the form:

BUFFER_MEMORY=0.1*SORT_AREA_SIZE

In this example, the total size of the sort area is specified by the database parameter SORT_AREA_SIZE, and 90% of this area will be memory for sorting and the other 10% of this area will be buffer space.

2. Minimum Sort Area Size for Automatic Direct Write Buffering

Many database applications in which sort operations are performed, require at least a minimum amount of memory for sorting. When the sort area is at such a minimum, allocating a portion of the sort area for buffer space may cause a marked decrease in performance because direct writes to buffer space will force sorts to disk. For example, direct write buffering may only present a performance advantage if there are at least 640 Kbytes of memory for the sort area. In this case, the automatic tuning mechanism should only start to allocate memory to buffer space when the sort area exceeds 640 Kbytes.

In one embodiment, the minimum amount of memory required to be available for the sort area before any memory is to be allocated to write buffers can be provided by a database parameter or switch called by the process utilizing the automatic database tuning mode.

Alternatively, the minimum memory requirement may be determined by basing it on the minimum write buffer configuration provided by the manual tuning parameters, SORT_WRITE_BUFFER_SIZE and SORT_WRITE_BUFFERS. For example, if the minimum values for SORT_WRITE_BUFFERS equals 2 and SORT_WRITE_BUFFER_SIZE equals 32 Kbytes, then the minimum buffer configuration is 2*32 Kbytes which is 64 Kbytes. In this case, if the portion of the sort area to be allocated to write buffers is ten percent, then write buffers will be allocated if the sort area is 640 Kbytes or greater.

While certain embodiments of automatic tuning may require a minimum threshold amount of sort area memory to be available before memory is allocated to the write buffers. Other embodiments, however, may not require a minimum threshold of memory to be exceeded. In this case as long as any memory is available for the sort area, a certain portion of that area will be allocated to write buffers.

3. Maximum Write Buffer Space

In certain applications, the allocation of write buffer space above a certain amount of memory may provide no further increase in data write performance. When this is the case, the automatic tuning mechanism should allocate memory from the sort area to the buffer space only up to this maximum threshold. Once this threshold is reached, any increase to the sort memory should be allocated entirely to the sort area, and none to the buffer space.

In one embodiment, the maximum memory threshold for buffer space can be provided by a database parameter or switch called by the process utilizing the automatic database tuning mode. For example, the maximum amount of memory for direct write buffers could be set at 512 Kbytes. In this case, if the portion of the sort area to be allocated to write buffers is ten percent, then ten percent of the sort area will be allocated to write buffers until the write buffer space reaches 512 Kbytes. Thereafter, any increase to the sort area, once the sort area reaches a size of 5.2 Mbytes will all be apportioned to the sort area, and none will be apportioned to the buffer space.

4. Size and Number of Write Buffers

For automatic tuning, once the amount of buffer space is determined, the number and size of the buffers comprising the buffer space must be determined. In one embodiment these variables can be determined by the use of internal database formulas which are optimized for various application and resource situations. For example, if the amount of buffer memory is below a certain value, and there are a minimum number of users, one 32 Kbyte buffer may be sufficient. In other situations, performance might be increased if this 32 Kbyte buffer is provided in the form of two 16 Kbyte buffers, or four 8 Kbyte buffers. Obviously, many different combinations are available and the specific formulae to be used will depend on actual implementation constraints and optimization criteria In this embodiment, the portion of the sort area to be allocated to write buffers would be determined by one database formula, and the configuration of the buffers comprising the buffer space would be determined by a second database formula.

In an alternative embodiment, the number and size of the write buffers created by automatic tuning may be provided by one or more additional database parameters such as the manual tuning parameters, SORT_WRITE_BUFFERS and SORT_WRITE_BUFFER_SIZE.

In this alternative embodiment, the portion of the sort area to be allocated to write buffers would be determined by a database formula, and the configuration of the buffers comprising the buffer space would be provided by programmed parameters.

Combining all of the variables addressed in this section provides one embodiment of automatic tuning as an example of the allocation of buffer memory for Sort Direct Writes. In this embodiment, a database formula would be utilized by a process performing sort operations to perform automatic tuning. This formula would allocate ten percent of the sort area memory above 640 Kbytes to write buffer space until a maximum of 512 Kbytes of buffer space is reached. For sort areas of less than 640 Kbytes, no memory is allocated to write buffers, and sorted data will be written to disk through the buffer cache.

The foregoing was intended only to be one example of possible values to be used in the determination of a minimum write buffer configuration. Actual values will depend on a number of factors such as the type of sort algorithm used by the database program, the number of database users, and the amount of memory available in the computer system, among others.

In the foregoing specification, the invention has been described with reference to specific embodiments thereof. It will, however, be evident that various modifications and changes may be made thereto without departing from the broader spirit and scope of the invention. The specification and drawings are, accordingly, to be regarded in an illustrative rather than a restrictive sense.

What is claimed is:

1. A method of allocating memory for storing data generated by a process that is performing a sort operation, the method comprising the steps of:
    inspecting a value assigned to a first parameter;
    if said first parameter is set to a first value, then using memory that is private to said process for storing data from said sort operation; and
    if said first parameter is not set to said first value, then using memory that is not private to said process for storing data from said sort operation.

2. The method of claim 1 further comprising the steps of:
    if said first parameter is set to a second value, then causing said process to buffer data from said sort operation in a buffer cache shared by other processes.

3. The method of claim 1 further comprising the step of writing data from said sort operation to said memory that is private to said process.

4. The method of claim 3 further comprising the step of writing to a database data from said memory that is private to said process.

5. The method of claim 1 further comprising the steps of:
    allocating a first amount of memory that is private to said process for storing data from said sort operation; and
    allocating a second amount of memory that is private to said process for performance of said sort operation.

6. A method of allocating buffer memory for storing data generated by a process that is performing a sort operation on data to be written to a database in a computer system, the method comprising the steps of:
    allocating random access memory (RAM) for a shared buffer cache;
    inspecting a value assigned to a first parameter;
    if said first parameter is set to a first value, then allocating no portion of RAM to said process as private temporary buffer memory for storing data from said sort operation; and
    causing said process to use said shared buffer cache for buffering data from said sort operation;
    if said first parameter does not have said first value, then allocating a portion of said RAM to said process as private temporary buffer memory for storing data from said sort operation; and
    causing said process to use said private temporary buffer memory for buffering data from said sort operation.

7. The method of claim 6 wherein the step of allocating the portion of said RAM to said process as private temporary buffer memory includes the step of allocating a portion of said shared buffer cache as said private temporary buffer memory.

8. A computer-readable medium carrying one or more sequences of one or more instructions for allocating memory for storing data generated by a process that is performing a sort operation, the one or more sequences of one or more instructions including instructions which, when executed by one or more processors, cause the one or more processors to perform the steps of:
    inspecting a value assigned to a first parameter;
    if said first parameter is set to a first value, then using memory that is private to said process for storing data from said sort operation; and
    if said first parameter is not set to said first value, then using memory that is not private to said process for storing data from said sort operation.

9. The computer-readable medium of claim 8 further comprising instructions for performing the steps of:
    if said first parameter is set to a second value, then causing said process to buffer data from sort operation in a buffer cache shared by other processes.

10. The computer-readable medium of claim 8 further comprising instructions for performing the step of writing data from said sort operation to said first amount of memory that is private.

11. The computer-readable medium of claim 10 further comprising instructions for performing the step of writing data from said first amount of memory that is private to a database.

12. The computer-readable medium of claim 8 further comprising instructions for performing the step of allocating a second amount of memory that is private to said process for performance of said sort operation.

13. The computer-readable medium of claim 8 further comprising instructions for performing the steps of:
    allocating a first amount of memory that is private to said process for storing data from said sort operation; and
    allocating a second amount of memory that is private to said process for performance of said sort operation.

14. A computer-readable medium carrying one or more sequences of one or more instructions for allocating memory for storing data generated by a process that is performing a sort operation, the one or more sequences of one or more instructions including instructions which, when executed by one or more processors, cause the one or more processors to perform the steps of:
    allocating random access memory (RAM) for a shared buffer cache;
    inspecting a value assigned to a first parameter;
    if said first parameter is set to a first value, then allocating no portion of RAM to said process as private temporary buffer memory for storing data from said sort operation; and
    causing said process to use said shared buffer cache for buffering data from said sort operation;
    if said first parameter does not have said first value, then allocating a portion of said RAM to said process as private temporary buffer memory for storing data from said sort operation; and
    causing said process to use said private temporary buffer memory for buffering data from said sort operation.

15. The computer-readable medium of claim 14 wherein the step of allocating the portion of said RAM to said process as private temporary buffer memory includes the step of allocating a portion of said shared buffer cache as said private temporary buffer memory.

16. A system for allocating memory for storing data generated by a process that is performing a sort operation, comprising:
    a memory, one or more processors coupled to the memory, and a set of computer instructions contained in the memory, the set of computer instructions including computer instructions which when executed by the one or more processors, cause the one or more processors to perform the steps of:

inspecting a value assigned to a first parameter;

if said first parameter is set to a first value, then using memory that is private to said process for storing data from said sort operation; and if said first parameter is not set to a first value, then using memory that is not private to said process for storing data from said sort operation.

17. A system for allocating buffer memory for storing data generated by a process that is performing a sort operation on data to be written to a database in a computer system, comprising:

a memory;

one or more processors coupled to the memory, and a set of computer instructions contained in the memory, the set of computer instructions including computer instructions which when executed by the one or more processors, cause the one or more processors to perform the steps of:

allocating random access memory (RAM) for a shared buffer cache;

inspecting a value assigned to a first parameter;

if said first parameter is set to a first value, then allocating no portion of RAM to said process as private temporary buffer memory for storing data from said sort operation; and causing said process to use said shared buffer cache for buffering data from said sort operation;

if said first parameter does not have said first value, then allocating a portion of said RAM to said process as private temporary buffer memory for storing data from said sort operation; and causing said process to use said private temporary buffer memory for buffering data from said sort operation.

\* \* \* \* \*